HIGH SPEED ANALOG-TO-DIGITAL CONVERTER

Filed March 19, 1963 5 Sheets-Sheet 1

INVENTOR.
KENNETH R. HACKETT
BY Philip H. Sheridan
ATTORNEY

INVENTOR.
KENNETH R. HACKETT
BY Philip H. Sheridan
ATTORNEY

HIGH SPEED ANALOG-TO-DIGITAL CONVERTER

Filed March 19, 1963

INVENTOR.
KENNETH R. HACKETT
BY Philip H. Sheridan
ATTORNEY

Sept. 13, 1966 K. R. HACKETT 3,273,141

HIGH SPEED ANALOG-TO-DIGITAL CONVERTER

Filed March 19, 1963 5 Sheets-Sheet 4

INVENTOR.
KENNETH R. HACKETT
BY Philip H. Sheridan
ATTORNEY

INVENTOR.
KENNETH R. HACKETT
BY Philip H. Sheridan
ATTORNEY

United States Patent Office
3,273,141
Patented Sept. 13, 1966

3,273,141

HIGH SPEED ANALOG-TO-DIGITAL CONVERTER

Kenneth R. Hackett, Boulder, Colo., assignor to Ball Brothers Research Corporation, Boulder, Colo., a corporation of Colorado Filed Mar. 19, 1963, Ser. No. 266,283
17 Claims. (Cl. 340—347)

This invention relates to a system for converting, at high speed, analog electric signals containing very high frequency components into digital form by the use of a delta modulation process, and particularly to the conversion of high resolution analog television signals into a series of binary pulses by the use of a delta modulation process.

In the delta modulation process, the changes in the analog signal are transmitted one bit at a time. This process can be operated at very high speeds so that the high frequency information in video signals can be encoded, and at the high bit rates required to convert high resolution television, that is, video systems with greater than 525 line resolution, to digital form and one can still obtain sufficient information for faithful reproduction of the original signal.

The delta modulation process of the prior art is shown schematically in block diagram form in FIG. 1. It is a type of digital servomechanism. The analog input signal is fed to the comparator which compares the input signal with a reconstructed signal, which in turn is obtained by integrating the binary output from the delta modulator. The delta modulator consists of comparator 1, a clock pulse generator 4, a binary decision circuit 3 and an integrator 5. The quantized output from integrator 5 is fed back to comparator 1, where it is compared with the input signal fed thereto. This feedback is degenerative and tends to maintain the error voltage output 2 of comparator 1 at a null.

If the error voltage 2 exceeds a threshold value, binary decision circuit 3 generates a pulse of one polarity of unit magnitude, as indicated at 6. If error voltage 2 does not exceed the threshold value, binary decision circuit 3 generates a pulse of opposite polarity of unit magnitude. The pulses occur at every clock period of clock pulse generator 4, indicated at 7. The pulses 6 generated by binary decision circuit 3 are fed into integrator 5, which stores each pulse.

The output of integrator 5, indicated at 8, is a quantized reconstruction of the input analog signal indicated at 9. Each binary pulse from integrator 5, as indicated at 8, represents $a+\Delta v$, or $a-\Delta v$ of the quantized video signal. Each voltage step at 8 is in the proper direction to diminish the magnitude of error voltage 2 of comparator 1. The pulse train 6 fed into integrator 5 also is the binary output 10, which is transmited over a transmission medium 11 to a receiver. At the receiving end the transmitted pulses are regenerated to remove noise and distortion acquired in the transmission link 11 and are fed into an integrator 12, which is identical with integrator 5. Integrator 12 produces a reconstructed analog output 13 of the analog input signal 9.

There are several important problems which should be solved to produce an accurate and efficient delta modulation system. The feedback loop delay through integrator 5 is required to be less than the time of one clock period 7 of clock pulse generator 4, so the effect of each decision of binary decision circuit 3 can be reflected back to the input to comparator 1 before the next decision in the series is made.

Secondly, pulses 6 from binary decision circuit 3 are required to be of constant magnitude, regardless of the magnitude of error voltages 2. If pulses 6 are slightly modulated, integrator 5 may take steps in voltage at 8, which are a function of the error voltages 2, and thus fail to produce at 8 an accurate quantized reconstruction of the input analog signal 9. This failure will as well appear at integrator 12 and reconstructed analog output 13. This, in turn results in a degradation of the receiver displayed video picture.

Thirdly, hysteresis in binary decision circuit 3 should be kept at a minimum. The triggering signal threshold of binary decision circuit 3 should be the same when error voltage 2 is positive going, as when it is negative going. If the two thresholds are different, hysteresis exists. This results in a tendency for the delta encoder to miss small amplitude information in video signal input 9.

Accordingly, it is an important object of this invention to provide a high speed analog-to-digital converter employing the delta modulation process and including a binary decision circuit wherein hysteresis is minimized.

Another object of this invention is to provide such a converter wherein the pulse from the binary decision circuit is kept at a substantially constant magnitude regardless of the magnitude of the error voltage.

Additional objects of the invention will become apparent from the following description, which is given primarily for purposes of illustration, and not limitation.

Stated in general terms, the objects of this invention are attained by cascading two, or more, decision circuits. The output of the first of the two cascaded decision circuits is a substantially constant amplitude pulse. This pulse is, however, slightly pulse width modulated by the error signal of the comparator which is fed to the first decision circuit. To minimize, or eliminate, the effects of this pulse width modulation of the output of the first decision circuit, the time for the decision in the second decision circuit is slightly delayed to such a point in time where the output pulse of the first decision circuit has reached a steady value. To impart very high speed characteristics to the analog-to-digital converter of this invention, tunnel diodes, because of their inherently very high speed properties, are used in the cascaded decision circuits.

Although the pulse width modulations of the output pulses from the cascaded decision circuits are reduced to a negligible amount by the arrangement described in the paragraph immediately above, a very minute amount of pulse width modulation on the decision circuit output pulses from the decision circuit can cause a large amount of degradation to the reconstructed video picture obtained at the receiver. Over a period of time the fractional errors, due to the minute amount of decision circuit output pulse width modulation, can amount to a relatively large value. In accordance with the present invention, this defect or disadvantage was minimized or eliminated by using an integrating circuit which has a short decay time to prevent the accumulation of the many fractional errors due to a minute amount of decision circuit output pulse width modulation. An integrating circuit with substantially identical decay characteristics is used at the receiver to obtain reconstructed video pictures of maximum quality and minimum degradation.

A more detailed description of a specific embodiment of the invention is given below with reference to the accompanying drawings, wherein.

Figure 1:
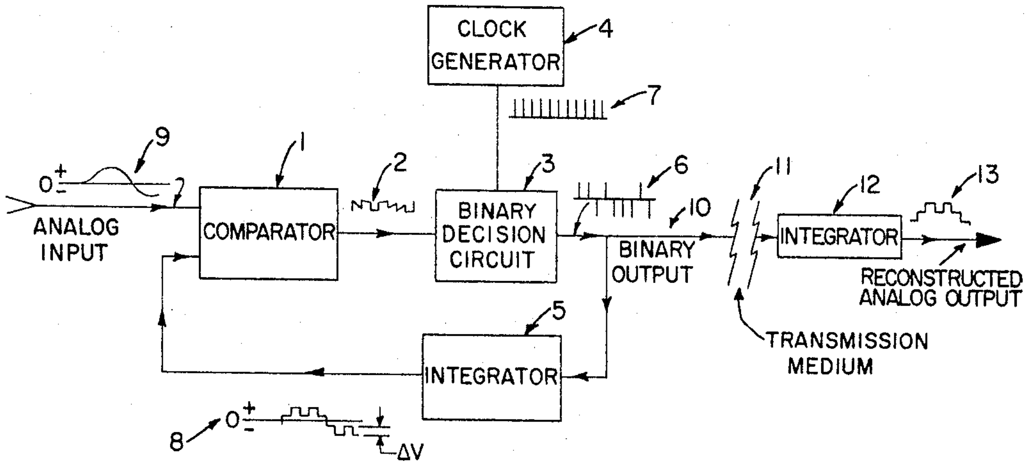
FIG. 1 is a block diagram schematically showing a prior art type of analog-to-digital converter employing a delta modulation process.
Figure 7:
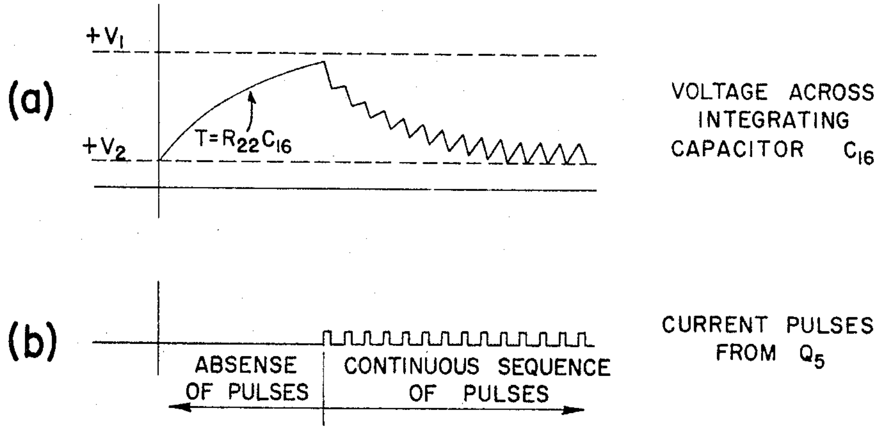
Figure 2:
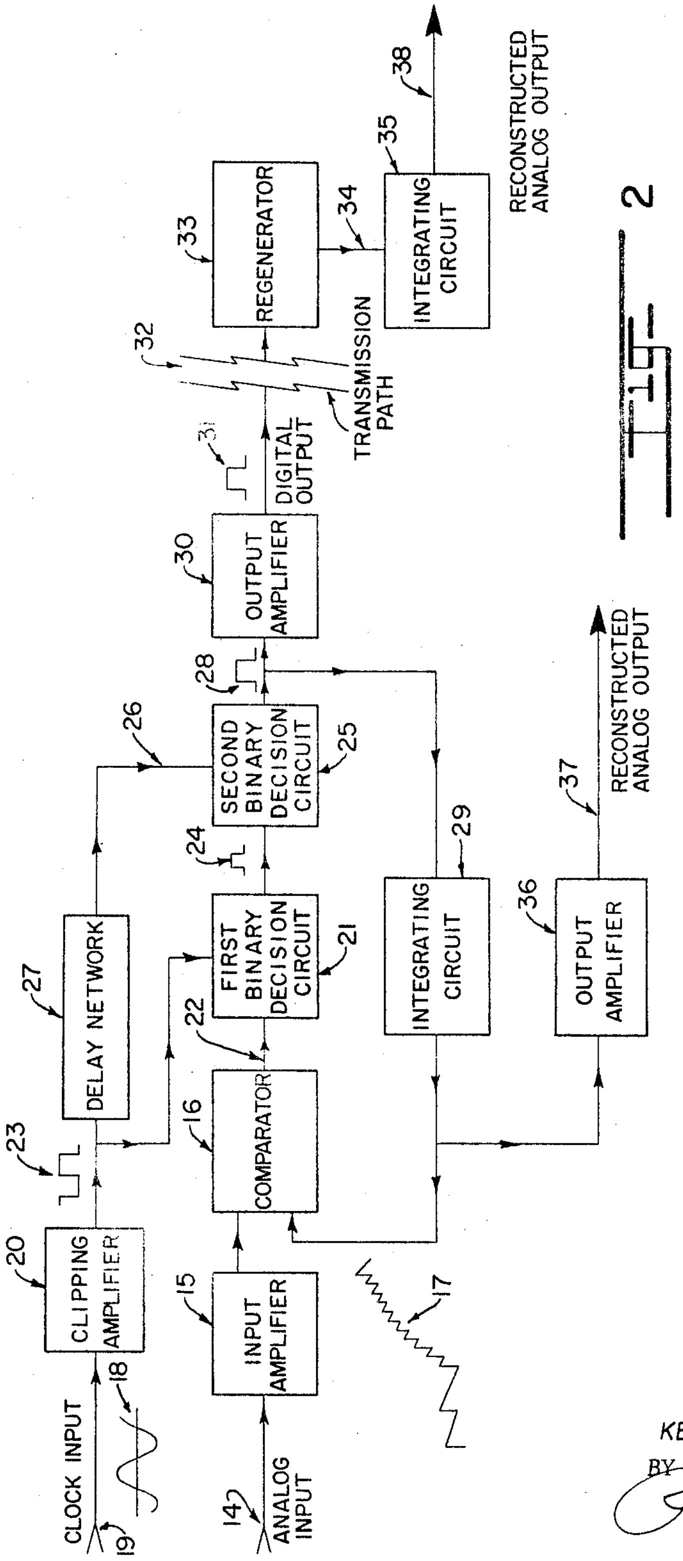
FIG. 2 is a block diagram schematically showing a specific embodiment of a high speed analog-to-digital converter of the present invention employing a modified delta modulation process.
Figure 8:
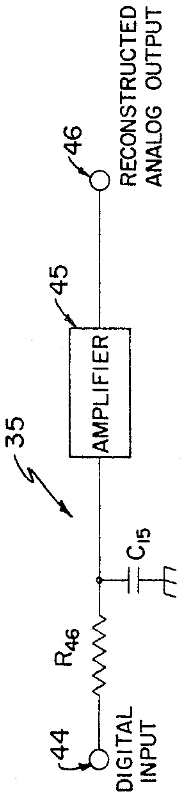
Figure 5:
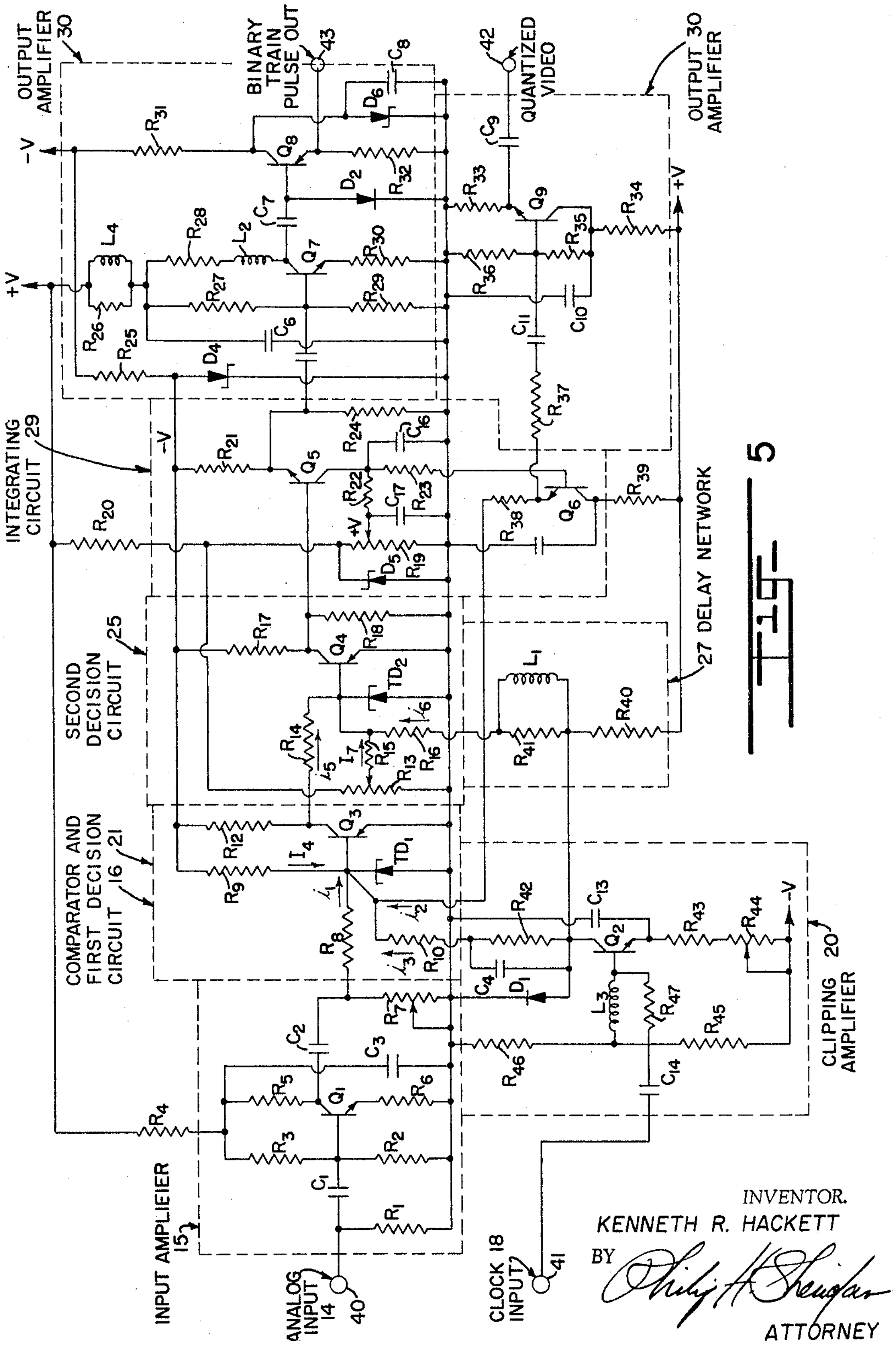
Figure 6:
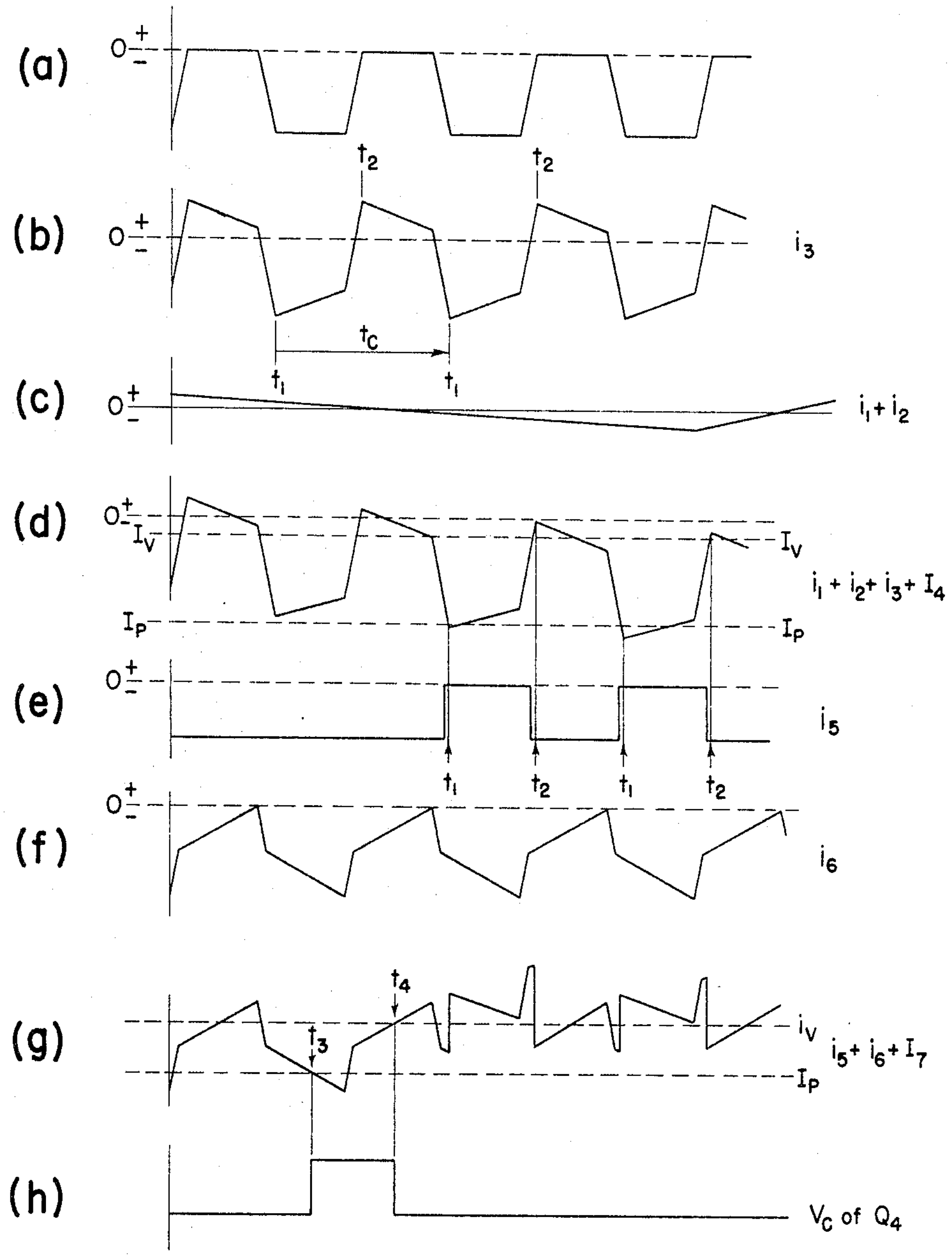

FIGS. 3*a* to 3*d* show schematic voltage-time diagrams characteristic of the prior art type of system shown in FIG. 1;

FIGS. 4*a* to 4*d* show schematic voltage-time diagrams characteristic of a specific embodiment of the system of the present invention shown in FIG. 2;

FIG. 5 is a schematic circuit diagram showing a specific embodiment of the high speed analog-to-digital converter of the present invention;

FIGS. 6*a* to 6*g* show schematic current-time diagrams characteristic of the specific embodiment of the invention shown in FIG. 5;

FIG. 6*h* shows a schematic voltage-time diagram representing the pulse output of the second decision circuit, and characteristic of the specific embodiment of the invention shown in FIG. 5;

FIGS. 7*a* and 7*b* graphically illustrate the voltage across integrating capacitor $C_4$ and current pulses from transistor $Q_5$, respectively; and FIG. 8 is a schematic circuit diagram of an RC network employed at the receiver.

In the specific embodiment of the invention shown schematically in block diagram form in FIG. 2, the input analog signal 14 enters the input terminal. The analog signal is fed to the comparator 16 via the input amplifier 15, where it is compared with the reconstructed signal 17 fed to the comparator via the feedback loop. The sinewave clock signal 18 enters the input terminal 19, and is converted into a squarewave signal 23 by the clipping amplifier 20. The squarewave clock signal 23 drives the first binary decision circuit 21.

If the error signal 22 from comparator 16 exceeds the threshold value of first binary decision circuit 21, a pulse 24 is generated. If error voltage 22 does not exceed the threshold value, first binary decision circuit 21 does not generate a pulse 24. Pulse 24 either occurs or does not occur at each clock period 18. Pulses 24 emerging from first decision circuit 21 have some pulse width modulation, which is proportional to error signal 22, from comparator 16.

To remove this pulse width modulation, the second decision circuit 25 is used. The clock signal 26 driving second binary decision circuit 25 is derived by delaying squarewave 23 slightly by the delay network 27. Second decision circuit 25 responds slightly after the leading and trailing edges on the pulse width modulated pulse 24. This results in a pulse train 28 from second decision circuit 25, which either exists or does not exist at each clock period 18, and is of constant magnitude.

Pulses 28, generated by second binary decision circuit 25, are fed to the integrating circuit 29, which stores each pulse. Integrating circuit 29 has a short decay time, whereas the integrator described in the prior art system, has infinite decay time. The output of integrating circuit 29 is a reconstructed signal 17, of input analog signal fed at terminal 14. Each voltage step of reconstructed signal 17 is in the proper direction to diminish error signal 22 of comparator 16.

Pulse train 28, fed into integrating circuit 29, also is coupled to the digital output signal 31, by the output amplifier 30. This output pulse train 31 contains the digital information representing the analog input introduced at terminal 14. It is transmitted over a transmission medium 32. At the receiving end, transmitted pulse train 31 is regenerated in regenerator 33 to remove noise and distortion acquired in the transmission path 32. The regenerated pulses at 34 are fed to an integrating circuit 35, which is identical to integrating circuit 29 in the analog-to-digital converter feedback loop. Integrating circuit 35 has the same decay characteristics as integrating circuit 29.

The reconstructed analog output signal is coupled to the output terminal 37, via the output amplifier 36. Output terminal 37 is used to monitor the performance of the analog-to-digital converter.

Figure 3:
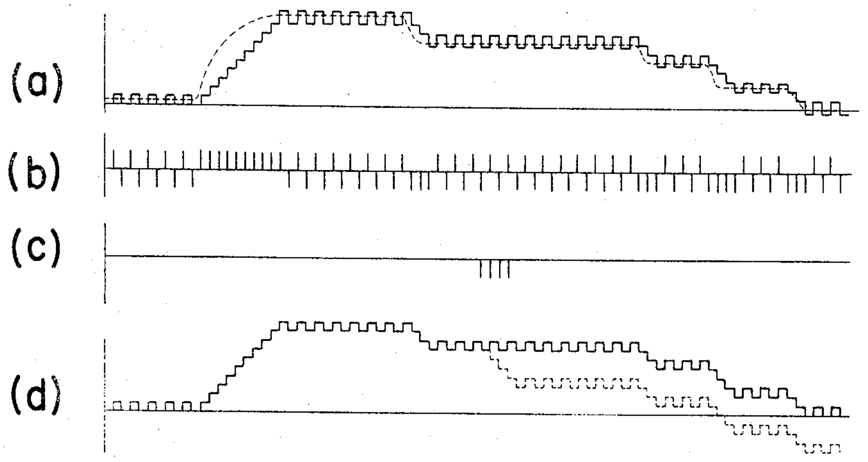

By using integrating circuit 29, in accordance with the invention, which has a short decay time to prevent the accumulation of many fractional errors due to minute amounts of decision circuit output pulse width modulation, further advantages are realized. The resulting system of the invention is much less sensitive to bit errors. This is illustrated with reference to FIGS. 3*a* to 3*d*, which show schematic voltage-time diagrams characteristic of the prior art type of system shown in FIG. 1. In FIG. 3*a* the solid line represents the voltage on the integrator 5 in the feedback loop, and the broken line the input analog signal 9 of a basic delta modulator of the type shown in FIG. 1. The voltage on the integrator 5 in the feedback loop tends to follow, one step at a time, the input analog signal 9. FIGURE 3*b* shows the pulse train, such as 6, which is transmitted to the integrator 12 of the receiver. The reconstructed signal, such as 13, at the receiver is shown in FIG. 3*d* as a solid line. It is a reproduction of the integrator waveform shown in FIG. 3*a* as a solid line. The instantaneous voltage on integrator 12 of the receiver is a function of all previous data received thereby. This feature makes the prior art basic delta modulator very susceptible to bit errors. Any bit errors which are received by integrator 12, such as the bit error shown in FIG. 3*c*, cause a permanent displacement of the integrator voltage, as shown by the broken line in FIG. 3*d*. Such bit errors remain permanently in the basic delta modulator of the prior art.

In the integrating circuit 29, according to a specific embodiment of the present invention, shown schematically in the block diagram of FIG. 2, the integrating circuit has a short decay time to prevent the accumulation of many fractional errors, such as those due to decision circuit output pulse width modulation, for example. A pulse of one polarity is used to drive integrator 29 instead of a pulse of two polarities. The information conveyed by the single polarity pulse should be binary. This is accomplished by having the pulse either exist or not exist at each clock period 18. This in turn is achieved by having the integrating circuit 29 consist of an integrating capacitor and a resistor. The capacitor charges one step of voltage when there is a pulse and discharges in the absence of a pulse. Due to the presence of the resistance, the capacitor discharges, in the absence of a pulse, to a point to which it would normally be driven by a pulse of opposite polarity. As in the case of the basic delta modulation process of FIG. 1, the voltage on the integrating capacitor, shown as a solid line in FIG. 4*a*, tends to follow the analog input signal 14, shown in FIG. 4*a* as a broken line. The solid line of the voltage on the integrating capacitor is non-linear because of its voltage leakage characteristics.

Figure 4:
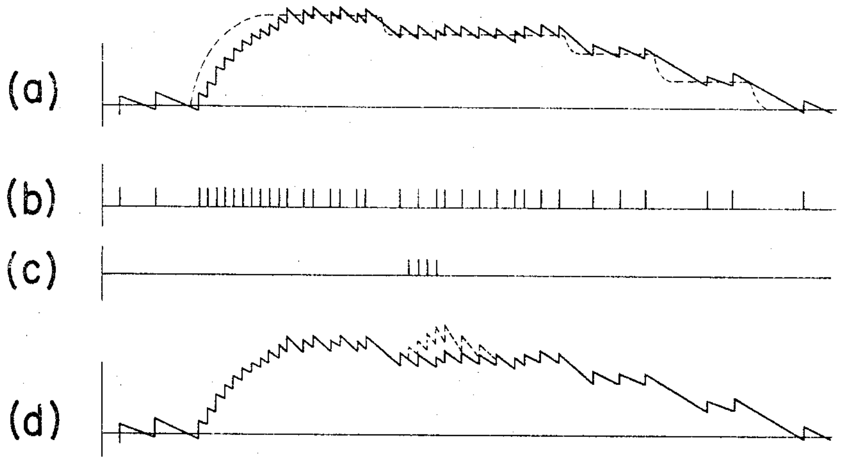

This non-linearity of the voltage on the integrating capacitor results in the production of a binary pulse train output, illustrated in FIG. 4*b*, which has a duty cycle proportional to the instantaneous analog voltage input signal 14. The binary pulse train output is transmitted to the integrator 35 in the receiver, which is identical to the integrator 29 in the feed back loop, and the output 38 is reconstructed at the receiver. This reconstructed analog output 38 is shown in FIG. 4*d* as a solid line. The voltage on the integrating capacitor is a function of the duty cycle of the incoming bit stream 31. If bit errors occur, such as an error illustrated in FIG. 4*c*, the voltage on the integrating capacitor is displaced temporarily, as illustrated by a broken line in FIG. 4*d*. Since the voltage on the integrating capacitor tends to be a function of the duty cycle, the proper operating voltage, shown as a solid line in FIG. 4*d*, is assumed soon after the passage of the disturbance caused by the bit errors.

The decision circuit used in the high speed analog-to-digital converter of this invention is inherently free of hysteresis. The error voltage 22 put out by the comparator 16 and fed to the decision circuit 21 is controlled by the clock pulse generator, and is allowed to pass only in one direction across the threshold of first decision circuit 21 at each clock period 18. If error voltage 22 exceeds the threshold voltage of first decision circuit 21, a pulse is generated as output 24 of the first decision circuit. This pulse represents one of two binary states. The error signal 22 of comparator 16 is then offset by the clock pulse 23 below the threshold voltage of first decision circuit 21 so that the threshold voltage again can be approached from the same voltage direction at the next clock pulse generator period 18. If the threshold voltage of first decision circuit 21 is not exceeded at a clock period 18, no pulse is generated by the decision circuit. This situation is a representation of the other binary state. Since the error voltage 22 from comparator 16, fed to first decision circuit 21, is permitted to cross the threshold voltage of the decision circuit only in one direction, there is no hysteresis. This is a very important feature of the invention.

A schematic circuit diagram of a specific embodiment of the high speed analog-to-digital converter of the invention is shown in FIG. 5. The incoming analog signal 14 is fed, through input terminal 40, and is terminated by resistor $R_1$. The signal is coupled via capacitor $C_1$, into the transistor $Q_1$ which amplifies and inverts the analog signal. The transistor amplifier $Q_1$ is a standard class A transistor amplifier which is biased to the proper operating point by the resistor voltage divider $R_2$ and $R_3$. Resistor $R_6$ is used for emitter degeneration, which improves the temperature stability of transistor amplifier $Q_1$. Resistor $R_4$ and capacitor $C_3$ comprise a decoupling filter which prevents noise from the positive power supply from entering transistor amplifier $Q_1$. It also prevents any of the input analog signal 14 from feeding into the positive power supply from transistor amplifier $Q_1$. The amplified analog signal is developed across resistor $R_5$ and is coupled to the variable resistor $R_7$, via the capacitor $C_2$.

The variable resistor $R_7$ controls the gain of transistor amplifier $Q_1$ by shunting a variable amount of the signal to ground. The amplified and inverted analog signal is fed via resistor $R_8$, to the tunnel diode $TD_1$, where the signal is compared with the reconstructed output of the converter. The reconstructed output is fed back to tunnel diode comparator $TD_1$ via the resistor $R_{38}$. The reconstructed output signal is degenerative and the sum of the analog signal $i_1$ and the reconstructed signal $i_2$ fed to tunnel diode comparator $TD_1$ (the error signal) is maintained at a null.

Tunnel diode $TD_1$ also is used as the first decision element of the two cascaded decision circuits. The decision circuit is controlled by the clock pulse generator feeding to terminal 41 so that a decision can be made at a specific time during each clock period. The clock signal 18 fed into terminal 41, which is a sine wave, enters into the clipping transistor amplifier $Q_2$, via resistor $R_{47}$ and capacitor $C_{14}$ which generates a square wave, as illustrated by a solid line in FIG. 6*a*. The symmetry of this square wave is adjusted by the variable resistor $R_{44}$ which is in series with resistor $R_{43}$. Resistors $R_{45}$ and $R_{46}$ comprise a voltage divider which establishes the proper operating voltage at the base of transistor $Q_2$. Inductor $L_3$ is used to increase the impedance and series of the voltage divider $R_{45}$ and $R_{46}$. Thus it increases the input impedance to the base of transistor $Q_2$. The A.C. component of the clock signal is shunted from the emitter of transistor $Q_2$ to ground by capacitor $C_{13}$. This results in a D.C. potential at the base of $Q_2$.

The collector of clipping transistor amplifier $Q_2$ is returned to a positive voltage $+V$ by the resistor $R_{40}$, but it is clamped to ground by the diode $D_1$. The square wave of clipping transistor amplifier $Q_2$ is at ground potential during one-half of a cycle while $Q_2$ is cut off, and it is at a negative potential during the other half of the cycle while $Q_2$ is in saturation. This resulting square wave signal is fed to tunnel diode $TD_1$ via the RC network of resistor $R_{42}$, resistor $R_{10}$ and capacitor $C_4$. The resulting current waveform $i_3$, that is fed to tunnel diode $TD_1$ via this RC network, is shown in FIG. 6*b*.

The bias current $I_4$, established by the resistor $R_9$, sets tunnel diode $TD_1$ to the desired current-voltage operating point. The current waveform $i_3$ fed to tunnel diode $TD_1$ is larger than the error signal current $i_1+i_2$, illustrated in FIG. 6*c*, and thus current $i_3$ controls the triggering time of tunnel diode $TD_1$. The negative peak of the signal, which is the sum of currents $i_3+(i_1+i_2)+I_4$, occurs at time $t_1$, as illustrated in FIG. 6*d*. When the sum of currents $i_3+(i_1+i_2)+I_4$ exceeds the triggering threshold current $I_p$ of tunnel diode $TD_1$, the tunnel diode switches to the high voltage state. If the sum of these currents flowing in tunnel diode $TD_1$ does not exceed the threshold current $I_p$, the tunnel diode does not switch to the high voltage state.

The current waveform $i_3$ fed to tunnel diode $TD_1$ tapers to a lower value after the peak has been reached at time $t_1$, FIG. 6*b*, and it is therefore impossible for the error signal to trigger tunnel diode $TD_1$ at any time other than $t_1$. Current waveform $i_3$ tapers rather than returning to zero current immediately after time $t_1$, and enough energy is therefore available to switch tunnel diode $TD_1$ to the high voltage state. At time $t_2$ the positive peak of current waveform $i_3$ is sufficient to reset tunnel diode $TD_1$ back to the low voltage state, which again prepares it for time $t_1$ of the next clock period. In actual practice, tunnel diode $TD_1$ does not switch at exactly time $t_1$ because of the finite rise time of the waveform of the clock signal. Instead, the tunnel diode triggers at various points on the slope of the $i_3$ current waveform prior to time $t_1$ and resets at various points on the slope of the $i_3$ current waveform prior to time $t_2$, depending upon the amplitude of the error signal current sum $(i_1+i_2)$. This inexactness of the switching and resetting of tunnel diode $TD_1$ results in some pulse width modulation, mentioned hereinabove. This should be removed so that the system will operate correctly and not cause a degradation of the receiver-displayed video picture.

Tunnel diode $TD_1$ is coupled directly to the transistor $Q_3$, which becomes saturated when the tunnel diode is in the high voltage state, and is cut off when $TD_1$ is in the low voltage state. Thus there are two values of current $i_5$ that can flow into the tunnel diode $TD_2$ via resistor $R_{14}$. Current $i_5$ is approximately equal to zero when transistor $Q_3$ is in a state of saturation and when $Q_3$ is cut off, current $i_5$ is equal to $$\frac{-V'}{R_{12}+R_{14}}$$

Voltage $-V'$ is stablized by the zener diode $D_4$. The bias current flows into $D_4$ via resistor $R_{25}$. This results in a square current waveform shown in FIG. 6*e*, which is fed to tunnel diode $TD_2$ via the resistor $R_{14}$. The clock signal is delayed slightly by the RL network consisting of resistor $R_{41}$, resistor $R_{16}$ and inductance $L_1$. This results in the current waveform $i_6$ illustrated in FIG. 6*f*. The bias current $I_7$ flows in resistor $R_{15}$ and maintains tunnel diode $TD_2$ at the optimum current-voltage operating point, and is adjusted for this purpose by the potentiometer $R_{13}$. The voltage across the poteniometer $R_{13}$ is stablized by the zener diode $D_5$. The bias current flows into the zener diode $D_5$ via the resistor $R_{20}$.

When tunnel diode $TD_1$ does not switch to the high voltage state, the current sum $(i_5+i_6+I_7)$, indicated in FIG. 6*g*, is of sufficient magnitude to exceed the current triggering threshold $I_p$ of tunnel diode $TD_2$. As a result, tunnel diode $TD_2$ switches to the high voltage state at a time $t_3$, and is reset to the low voltage state at a time $t_4$, as illustrated in the current waveform of FIG. 6*g*. If tunnel diode $TD_1$ switches to the high voltage state, transistor $Q_3$ becomes saturated and current $i_5$ goes to a value of zero at approximately time $t_1$. The sum of the currents $i_6$ and $I_7$ alone is not a sufficiently large current to trigger tunnel diode $TD_2$ to the high voltage state, so $TD_2$ remains in the low voltage state. The modulations on the first decision occur at times $t_1$ and $t_2$ in the form of time jitter. The second decision switches at a time ($t_3$ and $t_4$) which is not affected by the jitter of the transients at time $t_1$ and $t_2$. This results in the second decision being free of pulse width modulations.

It will be seen, therefore, that by cascading the two decision circuits 21 and 25 employed in the high speed analog-to-digital converter of the invention, as illustrated in FIGS. 2 and 5, the pulse width modulation of the output of the first decision circuit 21 is substantially eliminated. The time for the decision in the second decision circuit 25 is slightly delayed to that the output pulse of the first decision circuit has reached a steady value, as described hereinabove.

It was also pointed out hereinabove that by using an integrating circuit 29 with a short decay time in the delta modulation process of the invention, the accumulation of many fractional errors is prevented and the system becomes much less sensitive to bit errors. Accordingly, tunnel diode $TD_2$, as shown in FIG. 5, is coupled to the base of transistor $Q_4$, which is driven in and out of saturation by $TD_2$, as $TD_2$ switches to the high voltage state and resets back to the low voltage state. This is shown in FIG. 6*h*. The collector voltage of transistor $Q_4$ is determined by the voltage divider consisting of resistors $R_{17}$ and $R_{18}$. The emitter voltage at transistor $Q_5$ is established by the voltage divider consisting of resistors $R_{21}$ and $R_{24}$. When transistor $Q_4$ is not conducting current, the collector voltage thereof is slightly more positive than the emitter voltage of transistor $Q_5$. In this situation, the existent potential difference is not sufficient to overcome the base-to-emitter voltage of transistor $Q_5$. As a result, no current flows in the base of transistor $Q_5$ and, therefore, no current flows in the collector of $Q_5$.

When transistor $Q_4$ is switched into a state of saturation by tunnel diode $TD_2$, transistor $Q_5$ conducts a current pulse with an approximate amplitude of $$\frac{-V'}{R_{21}}$$

Thus transistor $Q_5$ acts as a constant current generator which pumps electric charge into the integrating capacitor $C_{16}$. The resulting electric charge $\Delta Q$ transferred to the integrating capacitor $C_{16}$ is equal to $$\frac{-V'}{R_{21}}(t_4-t_2)$$

The voltage step V for each pulse is equal to $$\frac{\Delta Q}{C_{16}}$$

The input analog signal can be quantized to as many levels as desired by the proper choice of the value of integrating capacitor $C_{16}$. Thus the integrator circuit 29, FIG. 2, is driven by a current pulse of only one polarity produced from the second decision circuit 25, this current pulse occurs either at a clock period 18, or it does not occur at such a period. It it does not occur at such a period, the resistor $R_{23}$, FIG. 5, causes enough charge to leak off the integrating capacitor $C_{16}$ in the absence of the pulse to produce the same or similar effect as is produced in conventional integrator circuits by a pulse of the opposite polarity.

The dynamic range of the integrator circuit is between $+V_1$ at the upper extreme, which is the voltage to which the integrating capacitor $C_{16}$ will charge in the absence of pulses, and $+V_2$ at the lower limit, where the average current for a continuous pulse train from transistor $Q_5$ The input analog signal can be quantized to as many levels equals the current flowing in resistor $R_{22}$; that is, $$\frac{-V}{R_{21}}\frac{(t_4-t_3)}{t_c}=\frac{V_1-V_2}{R_{22}}$$

FIG. 7*a* graphically illustrates the voltage across integrating capacitor $C_{16}$ and FIG. 7*b* similarly illustrates the current pulses from transistor $Q_5$. Voltage $V_1$ is adjustable by the potentiometer $R_{19}$. The A.C. component of the signal is shunted to ground by the capacitor $C_{17}$. The voltage across the potentiometer $R_{19}$ is also stabilized by the zener diode $D_5$.

The reconstructed signal 17, FIG. 2, obtained as output from the integrator circuit 29, is coupled by the emitter of follower transistor $Q_6$, FIG. 5, via resistor $R_{38}$, to the input of the comparator 16 component tunnel diode $TD_1$, which also is used as the first decision element of the two cascaded decision circuits 21 and 25. The reconstructed signal 17 also is coupled by the emitter of follower transistor $Q_9$ to a low impedance quantized video output circuit through terminal 42 for monitoring purposes. The reconstructed analog signal is fed to the base of transistor $Q_9$ via the resistor $R_{37}$ to attenuate the signal and capacitor $C_{11}$. The voltage divider consisting of resistors $R_{35}$ and $R_{36}$ establishes the voltage operating point of the emitter follower transistor $Q_9$. The R.C. filter consisting of resistors $R_{34}$ and capacitor $C_{10}$ is used to prevent noise and disturbance on the positive power supply from combining with the reconstructed analog signal. It also prevents the reconstructed signal from feeding into the positive power supply. The reconstructed analog signal appearing across resistor $R_{33}$, is coupled to the output 42, via the capacitor $C_9$.

The pulse train 28 at the emitter of transistor $Q_5$, which is the digital data sought, is amplified and inverted by transistor $Q_7$ and coupled to the binary pulse train output signal terminal 43 by the emitter of follower transistor $Q_8$. The voltage divider consisting of resistors $R_{27}$ and $R_{29}$, establishes the operating point of the transistor $Q_7$. Resistor $R_{30}$ is used in the emitter circuit of transistor $Q_7$ for temperature stability. The voltage pulse appears across the RL network consisting of resistor $R_{28}$ and inductor $L_2$. The inductor $L_2$ is used to improve the rise time characteristics of the pulse appearing at the collector of transistor $Q_7$.

The RLC network consisting of resistor R, inductor $L_4$, and capacitor $C_6$, comprises the decoupling filter which prevents any pulse energy from feeding into the positive power supply. The negative-going pulse appearing at the collector of transistor $Q_7$ is coupled to the base of transistor $Q_8$, via the capacitor $C_7$. The diode $D_2$ clamps the base of the pulse, the positive extreme, to ground potential. The negative voltage pulse is applied to the base of transistor $Q_8$. The zener diode $D_6$ stabilizes the collector voltage of emitter follower transistor $Q_8$ for a wide range of pulse duty cycle at the output 43. Resistor $R_{31}$ supplies the bias current for the zener diode $D_6$. Capacitor $C_8$ bypasses the high frequency components to ground. The voltage pulse which is applied to the base of the transistor $Q_8$ also appears across the resistor $R_{32}$. The emitter of $Q_8$ is connected directly to the output 43.

At the receiver, a simple R.C. network, illustrated in FIG. 8, is used. The time constant, $R_{46}$–$C_{15}$, must equal $R_{22}$–$C_{16}$ in the analog-to-digital converter for optimum reproduction of the analog signal. The digital signal enters terminal 44, and the reconstructed signal appears across capacitor $C_{15}$. In practice, the analog signal appearing across capacitor $C_{15}$ is amplified by a conventional wideband amplifier 45, and fed to the output terminal 46.

The highest bit rate produces an optimum image. In the present invention, the improved image is produced by eliminating errors through the use of the cascaded decision circuits, as described hereinabove, and the use of an integrating circuit having a short decay time to prevent the accumulation of fractional errors. Although a specific embodiment of the high speed analog-to-digital converter of the invention was described hereinabove as employing only two cascaded binary decision circuits, it will be understood that the use of more than two cascaded decision circuits is contemplated to be within the scope of the present invention. The use of more than two cascaded decision circuits results in an even greater elimination of errors and an even more improved image.

Obviously many other modifications and variations of the high speed analog-to-digital converter of the present invention are possible in the light of the teaching given hereinabove. It is, therefore, to be understood that, within the scope of the appended claims, the invention can be practiced otherwise than as specifically described.

What is claimed is:

1. A high speed analog-to-digital converter comprising an analog input amplifier circuit, a comparator circuit coupled with the amplifier circuit, a plurality of binary decision circuits connected in cascade relationship with each other and coupled with the comparator circuit, an integrating circuit coupled with the decision circuits and with the comparator circuit in feedback loop relationship, and an output amplifier circuit coupled with the decision circuits for transmitting therefrom a digital output converted from an analog input fed to the input amplifier.

2. A high speed analog-to-digital converter according to claim 1, wherein tunnel diodes are used as the decision elements of the cascaded decision circuits to impart very high speed characteristics to the converter.

3. A high speed analog-to-digital converter according to claim 1, wherein the integrating circuit is characterized by having a short decay time for preventing the accumulation therein of fractional errors from the cascaded decision circuits.

4. A high speed analog-to-digital converter according to claim 2, wherein the integrating circuit is characterized by having a short decay time for preventing the accumulation therein of fractional errors from the cascaded decision circuits.

5. A high speed analog-to-digital converter according to claim 4, wherein an integrating capacitor is used as the short decay time integrating element of the integrating circuit.

6. A high speed analog-to-digital converter according to claim 4, wherein the integrating circuit includes an integrating capacitor and a resistor, the integrating capacitor being adapted for charging one step of voltage when there is a clock pulse and discharging in the absence of a pulse through the resistor to a point to which it would normally be driven by a clock pulse of opposite polarity.

7. In a high speed analog-to-digital converter using a delta modulation process the improvement which consists of the use of two binary decision circuits in cascaded relationship with each other, the output of the first of the two decision circuits being a substantially constant amplitude pulse slightly pulse width modulated by the error signal of the comparator which is fed to the first decision circuit, the time for the decision in the second decision circuit being slightly delayed to a point in time where the output pulse of the first decision circuit has reached a steady value to eliminate or minimize the effects of the slight pulse width modulation of the output of the first decision circuit.

8. A high speed analog-to-digital converter according to claim 7, wherein tunnel diodes are used as the decision elements of the cascaded decision circuits to impart very high speed characteristics to the converter.

9. A high speed analog-to-digital converter according to claim 7, wherein an integrating circuit is employed in the feedback loop of the delta modulater characterized by having a short decay time for preventing the accumulation of fractional errors in the output of the cascaded decision circuit.

10. A high speed analog-to-digital converter according to claim 8, wherein an integrating circuit is employed in the feedback loop of the delta modulator characterized by having a short decay time for preventing the accumulation of fractional errors in the output of the cascaded decision circuit.

11. A high speed analog-to-digital converter according to claim 10, wherein an integrating capacitor is used as the short decay time integrating element of the integrating circuit.

12. A high speed analog-to-digital converter according to claim 10, wherein the integrating circuit includes an integrating capacitor and a resistor, the integrating capacitor being adapted for charging one step of voltage when there is a clock pulse and discharging in the absence of a pulse through the resistor to a point to which it would normally be driven by a clock pulse of opposite polarity.

13. A high speed analog-to-digital converter comprising analog input means, a comparator circuit for receiving an analog signal fed to said input means, at least a pair of binary decision circuits connected in cascade relationship with each other and coupled with the comparator circuit, an integrating circuit coupled with the decision circuits and with the comparator circuit in feedback loop relationship and output means coupled with the decision circuits for transmitting therefrom a digital output converted from hte analog signal fed to the input means.

14. A high speed analog-to-digital converter comprising analog input means, a comparator circuit for receiving an analog signal fed to said input means, at least a pair of binary decision circuits connected in cascade relationship with each other and coupled with the comparator circuit, an integrating circuit coupled with the decision circuits and with the comparator circuit in feedback loop relationship and output means coupled with the decision circuits for transmitting therefrom a digital output converted from the analog signal fed to the input means, said integrating circuit having a short decay time for preventing the accumulation therein of fractional errors from the cascaded decision circuits.

15. A high speed analog-to-digital converter comprising analog input means, a comparator circuit for receiving an analog signal fed to said input means, at least a pair of binary decision circuits connected in cascade relationship with each other and coupled with the comparator circuit, an integrating circuit coupled with the decision circuits and with the comparator circuit in feedback loop relationship, and output means coupled with the decision circuits for transmitting therefrom a digital output converted from the analog signal fed to the input means, said decision circuits having tunnel diodes as the decision elements thereof to impart very high speed characteristics to the converter.

16. In a high speed analog-to-digital converter using a delta modulation process the improvement which comprises the use of at least a pair of binary decision circuits in cascaded relationship with each other, the output of the first of the two decision circuits being a substantially constant pulse slightly pulse width modulated by the error signal of the comparator which is fed to the first decision circuit, the time for the decision in the second decision circuit being slightly delayed to a point in time where the output pulse of the first decision circuit has reached a steady value to eliminate or minimize the effects of the slight pulse width modulation of the output of the first decision circuit.

17. In a high speed analog-to-digital converter using a delta modulation process the improvement which comprises the use of at least a pair of binary decision circuits in cascaded relationship with each other, the output of the first of the two decision circuits being a substantially constant pulse slightly pulse width modulated by the error signal of the comparator which is fed to the first decision circuit, the time for the decision in the second decision circuit being slightly delayed to a point in time where the output pulse of the first decision circuit has reached a steady value to eliminate or minimize the effects of the slight pulse width modulation of the output of the first decision circuit, and an integrating circuit in the feedback loop of the delta modulator characterized by having a short decay time for preventing the accumulation of fractional errors in the output of the cascaded decision circuit.

References Cited by the Examiner

UNITED STATES PATENTS 2,965,891 12/1960 Martin ---------- 340—347

MAYNARD R. WILBUR, *Primary Examiner.*

L. W. MASSEY, *Examiner.*

W. J. ATKINS, *Assistant Examiner.*